US009725182B2

(12) United States Patent
Elabellaoui et al.

(10) Patent No.: US 9,725,182 B2
(45) Date of Patent: Aug. 8, 2017

(54) AIRCRAFT THROTTLE CONTROL DEVICE INCLUDING A CAM COUPLING

(71) Applicant: Safran Electronics & Defense, Boulogne Billancourt (FR)

(72) Inventors: Hafid Elabellaoui, Paris (FR); Jean-Eric Besold, Palaiseau (FR); Sebastien Pautard, Paris (FR); Thierry Cartry, Paris (FR); David Engler, Paris (FR); Etienne Merlet, Paris (FR)

(73) Assignee: Safran Electronics & Defense, Boulogne Billancourt (FR)

( * ) Notice: Subject to any disclaimer, the term of this patent is extended or adjusted under 35 U.S.C. 154(b) by 773 days.

(21) Appl. No.: 14/042,471

(22) Filed: Sep. 30, 2013

(65) Prior Publication Data

US 2014/0061389 A1 Mar. 6, 2014

Related U.S. Application Data

(63) Continuation of application No. 13/500,824, filed as application No. PCT/EP2010/006057 on Oct. 5, 2010, now abandoned.

(30) Foreign Application Priority Data

Oct. 6, 2009 (FR) ...................................... 09 04760

(51) Int. Cl.
*B64D 31/04* (2006.01)

(52) U.S. Cl.
CPC .................................... *B64D 31/04* (2013.01)

(58) Field of Classification Search
CPC ................................ B64D 31/04; B64D 31/06
USPC .......... 74/480 R, 483 R; 244/81, 110 B, 220, 244/224, 225; 416/25
See application file for complete search history.

(56) References Cited

U.S. PATENT DOCUMENTS 3,279,184 A * 10/1966 Felix .......................... F02K 1/76
                                                60/224
3,572,155 A * 3/1971 Banks .................... B64D 31/04
                                             74/490.14

FOREIGN PATENT DOCUMENTS

| FR | 3 005 302 | * 11/2014 |
| RU | 2 031 814 | * 3/1995 |
| SU | 533017 | * 10/1986 |

* cited by examiner

*Primary Examiner* — William C Joyce
(74) *Attorney, Agent, or Firm* — Muncy, Geissler, Olds & Lowe, P.C.

(57) ABSTRACT

An aeroengine control device including a mount and having pivotally mounted thereon a code wheel together with a main lever and a secondary lever, both for turning the code wheel. Each lever is movable between a rest position and a maximum actuation position. The secondary lever is mounted to pivot on the main lever. Cam paths are mounted on the code wheel and on the mount in such a manner that the main lever can move the code wheel when the main lever is moved while the secondary lever is in the rest position. The secondary lever can move the code wheel when the secondary lever is moved while the main lever is in the rest position, with movement of either lever being prevented when the other lever is clearly away from its rest position.

8 Claims, 4 Drawing Sheets

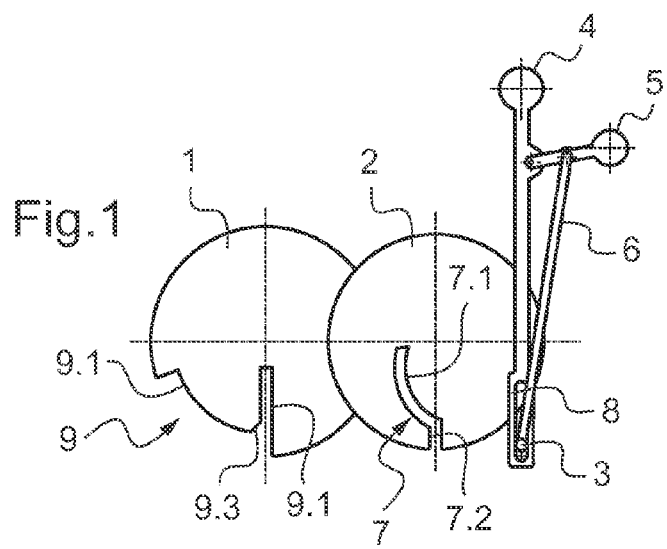
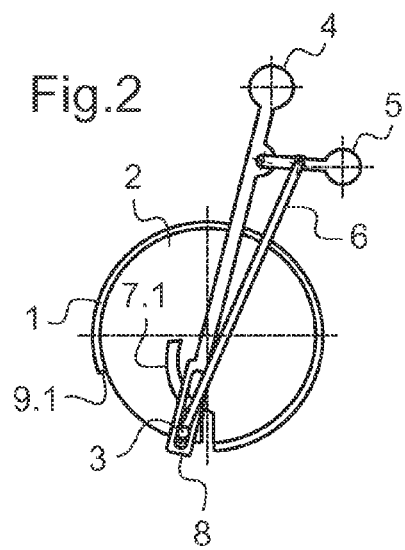
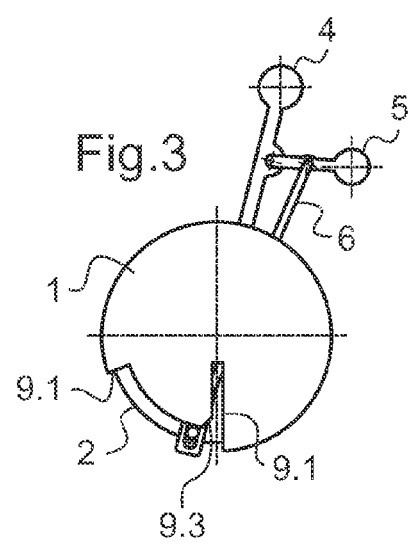
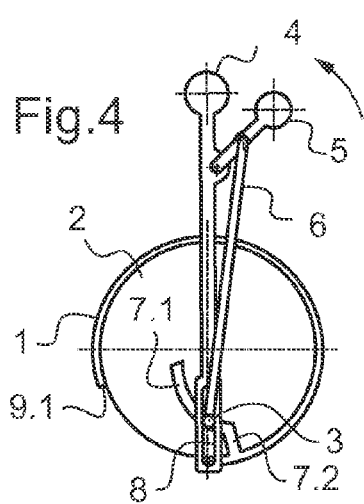
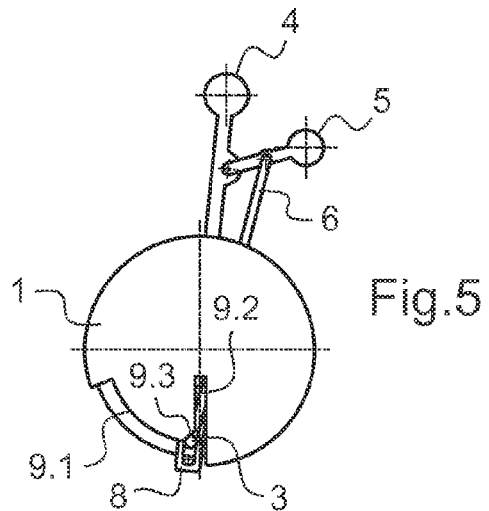

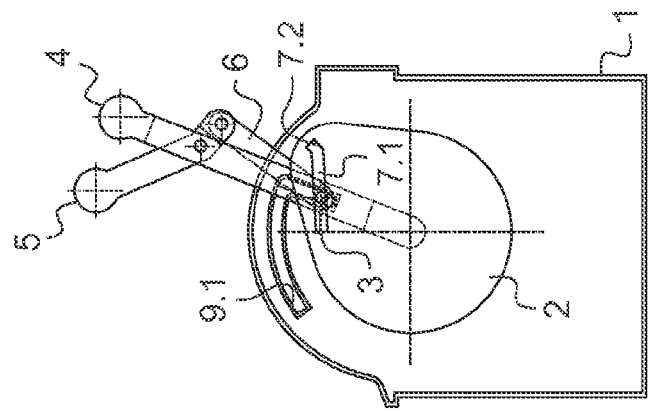
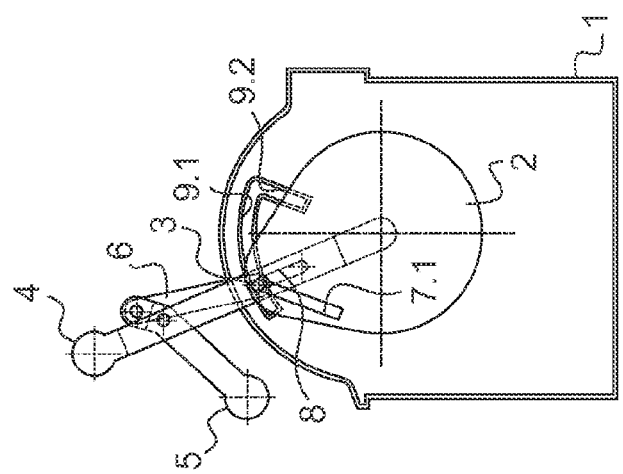
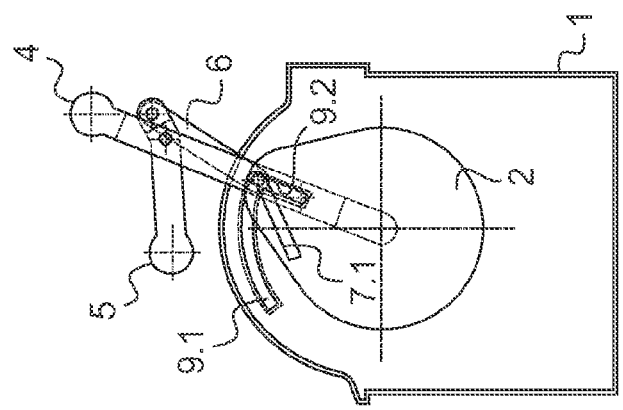

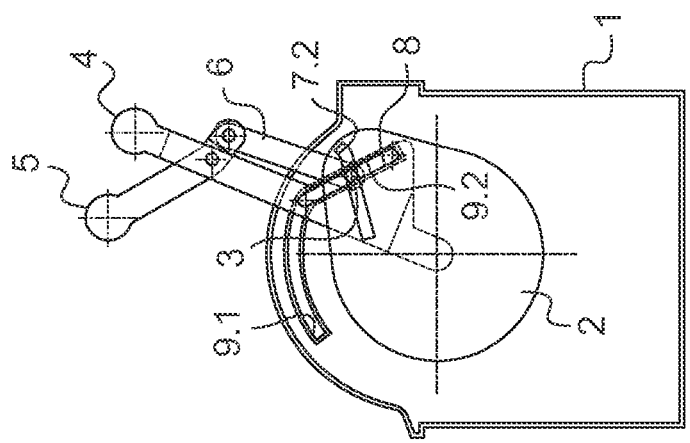
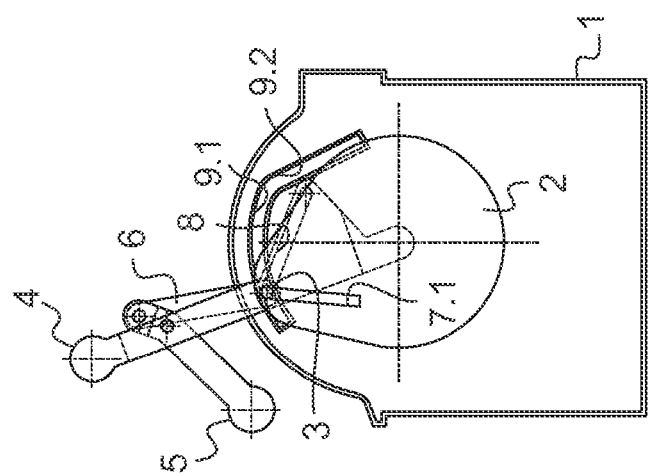
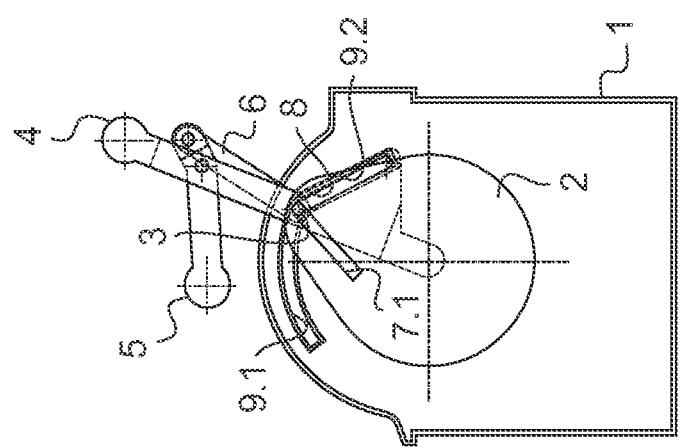

AIRCRAFT THROTTLE CONTROL DEVICE INCLUDING A CAM COUPLING

CROSS-REFERENCE TO RELATED APPLICATIONS

This application is a Continuation of co-pending application Ser. No. 13/500,824, filed on 6 Apr. 2012, which is a U.S. National Stage of International Application No. PCT/EP2010/006057 filed on Oct. 5, 2010, for which priority is claimed under 35 U.S.C. §120; and this application claims priority of application No. 09/04760 filed in France on Oct. 6, 2009 under 35 U.S.C. §119; the entire contents of all of which are hereby incorporated by reference.

BACKGROUND OF THE INVENTION

Field of the Invention

The present invention relates to an aeroengine throttle control device.

Brief Discussion of the Related Art

Modern turbojets are fitted with a thrust reversal device that enables a fraction of the exhaust stream leaving the turbojet to be directed towards the front of the turbojet (generally in a direction that makes an angle of about 45° relative to the forward direction of the aircraft) in order to assist the slowing down action of brakes while the aircraft is landing. Various reversal devices are in existence, and in particular devices using doors and devices using grids.

There also exist propeller engines that incorporate a thrust reversal device arranged to reverse propeller pitch.

The cockpit of an aircraft having such an engine is fitted with a throttle control device that enables the pilot to control both the rate at which fuel is admitted into the combustion chamber of the engine, and also the thrust reversal device. For this purpose, the control device comprises a mount having pivotally mounted thereon both a code wheel and a main lever or throttle lever, together with a secondary lever or thrust reversal lever, which levers are arranged to turn the code wheel. The code wheel is associated with sensors connected to an engine control unit. Each lever is movable between a rest position and a maximum actuation position. The thrust reversal lever is hinged to the throttle lever. The assembly comprising both levers is connected to the code wheel via a complex coupling system including an intermediate wheel on the pivot axis of the throttle lever and which is connected to the code wheel. Drive of the intermediate wheel by the levers is under the control of a device that prevents either lever from moving if the other lever is away from its rest position. That device relies on cams, toggle-action parts, or parts having strokes that present cusps, i.e. points where movement is reversed.

In the more elaborate systems, the stroke of each lever includes a transition zone in the immediate vicinity of its rest position. When a lever is in the transition zone and the other lever is moved away from its rest position, the first lever is returned to its rest position.

The coupling system occupies a considerable amount of space and is heavy, in particular because of the intermediate wheel. In addition, the forces transmitted are high and require parts of the coupling system to be dimensioned accordingly, thereby adding to the weight and the volume of the coupling system, particularly since any element in the coupling system between either of the levers and the code wheel must be duplicated in order to ensure the redundancy that is essential for the safety of the device.

SUMMARY OF THE INVENTION

An object of the invention is to provide means making it possible to improve at least some of the above drawbacks.

To this end, the invention provides an aeroengine control device comprising a mount, having pivotally mounted thereon a code wheel together with a main lever, and a secondary lever, both for turning the code wheel, each lever being movable between a rest position and a maximum actuation position, the secondary lever being mounted to pivot on the main lever. A first cam path is formed on a part secured to the code wheel and a second cam path is formed on the mount, the two cam paths having respective facing portions in which there is received a finger that is mounted on the main lever to slide parallel to the code wheel, with a connecting rod permanently connecting the finger to the secondary lever. The cam paths are arranged in such a manner that the main lever can move the code wheel when the main lever is moved while the secondary lever is in its rest position, and the secondary lever can move the code wheel when the secondary lever is moved while the main lever is in its rest position, with movement of either lever being prevented when the other lever is away from its rest position.

Thus, action on the main lever causes the finger to move along a circular arc, thereby directly driving the code wheel, and action on the secondary lever causes the finger to move in a straight line, which movement is transformed by the first cam path into turning of the code wheel. The finger co-operates with the cam paths that are arranged in such a manner that the main lever can drive the code wheel when the main lever is moved while the secondary lever is in the rest position, and the secondary lever can drive the code wheel when the secondary lever is moved while the main lever is in the rest position, with movement of either lever being prevented when the other lever is away from its rest position.

According to a first characteristic, the main lever pivots about the axis of the code wheel and the second cam path includes a first segment that is circularly arcuate about the axis of the code wheel, being of a radius that is determined to allow the main lever to pivot while keeping the secondary lever in the rest position, and a rectilinear second segment extending in a direction that is adapted to allow the secondary lever to move while keeping the main lever in the rest position.

Preferably, the second cam path includes a ramp between the first segment and the second segment, which ramp defines a transition zone in the vicinity of the rest position by acting on the finger in such a manner that when a first one of the levers is in the transition zone, moving the other lever towards its maximum actuation position causes the first lever to return to its rest position.

It is thus possible to move one of the levers while the other lever is close to its rest position, with the other lever then being returned automatically to its rest position.

According to a second characteristic, the first cam path has a first segment arranged to cause the code wheel to pivot when the finger is driven by the secondary lever being moved between its two positions, the first segment having a shape selected from the following group:

rectilinear, forming an angle relative to a radial direction of the code wheel; and curved, with its concave side facing towards the pivot axis of the code wheel.

Advantageously, the first cam path has a second segment extending radially from a periphery of the code wheel to the first segment.

This makes it possible to limit transmission of force from the code wheel to the secondary lever while the code wheel is being moved by the main lever.

BRIEF DESCRIPTION OF THE DRAWINGS

Other characteristics and advantages of the invention appear on reading the following description of particular, non-limiting embodiments of the invention.

Reference is made to the accompanying drawings, in which:

FIG. 1 is a diagrammatic exploded view of a control device in a first embodiment of the invention;

FIGS. 2 and 3 are diagrammatic views of the device, the main lever being moved away from its rest position (the mount being shown in the foreground in FIG. 3);

FIG. 4 is a view analogous to FIG. 2, the main lever being in the rest position and the secondary lever going towards its maximum actuation position;

FIG. 5 is a view analogous to FIG. 2, the main lever being moved away from its rest position and the secondary lever being in a transition zone (the mount being shown in the foreground relative to the code wheel);

FIGS. 9a-9c are views analogous to FIG. 6 showing a control device in a first variant of the second embodiment, with both levers in the rest position (FIG. 9a), the secondary lever only in the rest position (FIG. 9b), and the main lever only in the rest position (FIG. 9c); and FIGS. 10a-10c are views analogous to FIG. 6 showing a control device in a second variant of the second embodiment, with both levers in the rest position (FIG. 10a), the secondary lever only in the rest position (FIG. 10b), and the main lever only in the rest position (FIG. 10c).

DETAILED DESCRIPTION OF THE PREFERRED EMBODIMENTS

Figure 6:
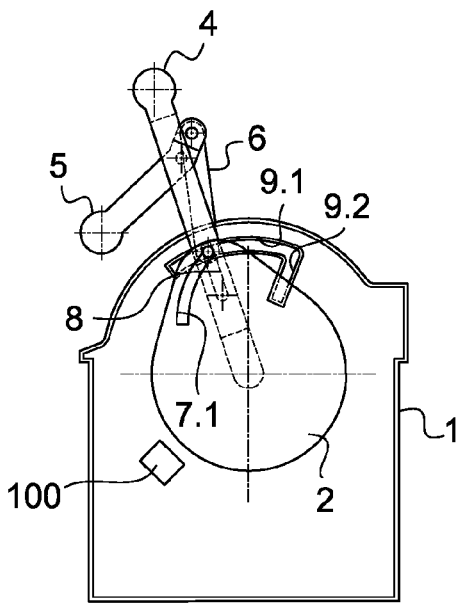
FIG. 6 is a diagrammatic view of a control device in a second embodiment of the invention, the main lever being moved away from its rest position.

The throttle control device described herein is arranged to control both the fuel flow rate and a thrust reversal device of an aeroengine.

With reference to FIGS. 1 to 5, the control device comprises a mount 1 having a code wheel 2 pivotally mounted thereon. Sensors 100 for sensing the angular position of the code wheel 2 (only shown in FIG. 6) are mounted on the mount 1 in register with the outline of the code wheel 2.

A main lever 4 is mounted on the mount 1 to pivot about the same axis as the code wheel 2. The main lever 4 has a radially offset structure with a secondary lever 5 mounted thereon to pivot about an axis parallel to the axis of rotation of the code wheel 2 and of the main lever 4. Each of the levers 4 and 5 pivots between a rest position (shown in FIG. 1 for both levers) and a maximum actuation position. The main lever 4 is a throttle control lever for controlling fuel flow rate, and its maximum actuation position can be seen on the right of FIG. 1: the pilot pushes the main lever 4 in order to increase the power delivered by the engine. The secondary lever 5 is a lever for controlling the thrust reversal device and its maximum actuation position is to the left of FIG. 1: the pilot pulls on the secondary lever 5 to obtain maximum thrust reversal.

The secondary lever 5 pivots on the radially offset structure of the main lever 4 and is connected directly and permanently by a connecting rod 6 to a finger 3 mounted on the main lever 4 in an oblong slot 8 therein so as to slide along a radial direction of the code wheel 2. In this example, the finger 3 extends on a side of the pivot axis of the code wheel 2 that is opposite from the side on which the secondary lever 5 is located.

A first cam path 7 is arranged in the code wheel 2 to receive the finger 3 slidably. The cam path 7 has a curved segment 7.1 with its concave side facing towards the pivot axis of the code wheel 2 and arranged to transform the sliding of the finger into turning movement of the code wheel 2, and a rectilinear segment 7.2 extending in a radial direction of the code wheel 2 from the end of the curved segment 7.1 that is furthest from the center so as to terminate in the vicinity of the periphery of the code wheel 2.

A second cam path 9 is arranged in the mount 1 to receive the finger 3 slidably. The cam path 9 comprises a circularly arcuate segment 9.1 extending in the vicinity of the periphery of the code wheel 2 but having a radius that is smaller than the radius of the code wheel 2, and a rectilinear segment 9.2 that extends in a radial direction of the code wheel 2 and that is connected to the circularly arcuate segment 9.1 by a ramp 9.3.

Whatever the position of the code wheel 2 relative to the mount 1, the cam paths 7 and 9 have portions that face each other and that receive the finger 3.

When the code wheel 2 is in its position common to the rest positions of both levers 4 and 5 (see FIG. 1), the finger 3 is in the rectilinear segments 7.2 and 9.2, facing the ramp 9.3.

From this position of the code wheel 2 that is common to the rest positions of both levers, the main lever 4 may be moved towards its maximum actuation position (FIGS. 2 and 3). By doing this, the finger 3 is engaged in the circularly arcuate segment 9.1 while remaining engaged in the rectilinear segment 7.2 so that the finger 3 moves along a circular arc and turns the code wheel 2. The circularly arcuate segment 9.1 prevents the finger 3 from moving towards the pivot axis of the code wheel 2 and thus prevents any movement of the secondary lever 5 away from its rest position.

From the position of the code wheel 2 that is common to the rest positions of both levers, the secondary lever 5 may be moved towards its maximum actuation position (FIG. 4). In so doing, the finger 3 is engaged in the curved segment 7.1 while remaining engaged in the rectilinear segment 9.2, such that the finger 3 moves in a straight line with this being transformed into turning movement of the code wheel 2 by the curved segment 7.1. The rectilinear segment 9.2 prevents any angular movement of the finger 3 and thus prevents any movement of the main lever 4 away from its rest position.

The ramp 9.3 serves to define a transition zone: when the finger 3 is level with the ramp 9.3, then the main lever 4 and/or the secondary lever 5 is in the vicinity of its respective rest position. When either lever 4 or 5 is moved towards its maximum actuation position, the ramp 9.3 serves to bring the other lever 5 or 4 into its rest position while the movement of the first lever 4 or 5 continues (FIG. 5).

The angle of inclination and the size of the ramp 9.3 serve to determine the extent of the transition zone for each of the levers. Thus, for example:

if the main lever 4 is offset through less than two degrees relative to its rest position, any movement of the secondary lever 5 away from its rest position causes the main lever 4 to return to its rest position; and if the secondary lever 5 is offset by less than fifteen degrees from its rest position, any movement of the main lever 4 away from its rest position causes the secondary lever 5 to be returned to its rest position.

The curvature of the curved segment 7.1 enables the pivoting of the code wheel 2 to be adapted to the stroke of the finger 3.

Elements that are identical or analogous to those described above are given the same numerical references in the description below of the second embodiment.

Figure 7:
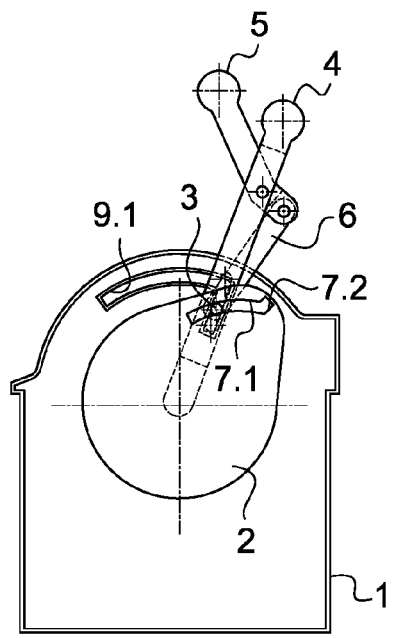
FIG. 7 is a view analogous to FIG. 6 of this embodiment, the secondary lever being moved away from its rest position.
Figure 8:
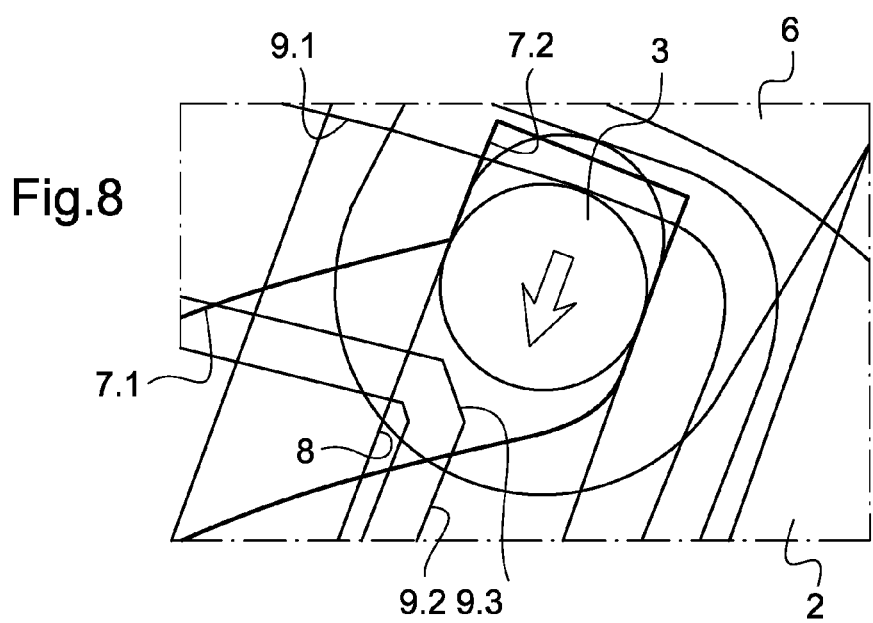
FIG. 8 is a fragmentary view on a larger scale of the device in the transition zone of the main lever.

With reference to FIGS. 6 to 8, the control device in the second embodiment comprises, as above, a mount 1, a code wheel 2, levers 4 and 5, a connecting rod 6 connecting the secondary lever 5 to a finger 3 received in a slot 8 in the main lever 4, and cam paths 7 and 9 formed respectively on the code wheel 2 and on the mount 1.

In this embodiment, the slot 8 lies between the pivot axis of the main lever 4 and the secondary lever 5, thereby leaving the bottom of the code wheel 2 free for engaging the sensors 100 (shown in FIG. 6).

The curved segment 7.1 lies in the vicinity of the periphery of the code wheel 2. The curvature of this segment defines the pivoting performed by the code wheel 2 as a function of radial movement of the finger 3. The rectilinear segment 7.2 receives the finger 3 when the main lever 4 is used for moving the code wheel 2. The finger 3 is then in contact with one or the other of the substantially radial faces of the rectilinear segment 7.1, thereby facilitating the transmission of force from the finger 3 to the code wheel 2 when the main lever 4 is actuated (FIG. 6, the maximum actuation position of the main lever 4 is to the left).

The cam path 9 has the same shape as above.

The movement of the code wheel 2 under drive from the main lever 4 can be seen in FIG. 6. The movement of the code wheel 2 under drive from the secondary lever 5 can be seen in FIG. 7 (the beginning of the movement is shown in FIG. 8).

In the variant of FIG. 9, the cam path 7 has a first rectilinear segment 7.1 at an angle relative to the second rectilinear segment 7.2 that extends in a radial direction relative to the code wheel 2. The segment 7.1, which is made rectilinear in contrast with the above-described variant so that it is easier to make, is oriented in such a manner as to transform the radial sliding of the finger 3 into pivoting of the code wheel 2 (FIG. 9c).

The rest positions of the levers and the actuation of the main lever 4 can be seen in FIGS. 9a and 9b.

In the variant of FIG. 10, the slot 8 forms an angle relative to the radial direction of the code wheel 2, and the rectilinear slot 9.2 forms an identical angle relative to the radial direction of the code wheel 2 when the main lever 4 is in its rest position.

The angle serves to adjust the pivoting movement of the code wheel 2 as a function of the stroke of the secondary lever 5.

Naturally, the invention is not limited to the embodiment described but covers any variant coming within the ambit of the invention as defined by the claims.

In particular, the invention may be obtained by combining characteristics from the above-described embodiments and variants.

The main lever may have two side plates between which the secondary lever and the connecting rod are mounted.

What is claimed is:

1. An aeroengine control device comprising:
a mount, having pivotally mounted thereon a code wheel together with a main lever and a secondary lever, both for turning the code wheel, each lever being movable between a rest position and a maximum actuation position, the secondary lever being mounted to pivot on the main lever, and
sensors for sensing the angular position of the code wheel being mounted on the mount in register with an outline of the code wheel,
wherein a first cam path is formed on a part secured to the code wheel and a second cam path is formed on a part secured to the mount, the two cam paths having respective facing portions in which there is received a finger that is mounted on the main lever to slide parallel to the code wheel, with a connecting rod permanently connecting the finger to the secondary lever, and wherein the cam paths are arranged in such a manner that the main lever can move the code wheel when the main lever is moved while the secondary lever is in its rest position, and the secondary lever can move the code wheel when the secondary lever is moved while the main lever is in its rest position, with movement of either lever being prevented when the other lever is away from its rest position.

2. The device according to claim 1, wherein the main lever pivots about the axis of the code wheel and the second cam path includes a first segment that is circularly arcuate about the axis of the code wheel, being of a radius that is determined to allow the main lever to pivot while keeping the secondary lever in the rest position, and a rectilinear second segment extending in a direction that is adapted to allow the secondary lever to move while keeping the main lever in the rest position.

3. The device according to claim 2, wherein the second cam path includes a ramp between the first segment and the second segment, which ramp defines a transition zone in the vicinity of the rest position by acting on the finger in such a manner that when a first one of the levers is in the transition zone, moving the other lever towards its maximum actuation position causes the first lever to return to its rest position.

4. The device according to claim 2, wherein the first cam path has a first segment arranged to cause the code wheel to pivot when the finger is driven by the secondary lever being moved between its two positions, the first segment having a shape selected from the following group:
rectilinear, forming an angle relative to a radial direction of the code wheel; and
curved, with its concave side facing towards the pivot axis of the code wheel.

5. The device according to claim 4, wherein the first cam path has a second segment extending radially from a vicinity of the periphery of the code wheel to the first segment.

6. The device according to claim 1, wherein the finger slides in a radial direction of the code wheel.

7. The device according to claim 1, wherein the finger slides in a direction forming an angle relative to the radial direction of the code wheel.

8. The device according to claim 1, wherein the main lever has two side plates between which the secondary lever and the connecting rod are mounted.

\* \* \* \* \*